US007626887B2

(12) United States Patent
Aarre et al.

(10) Patent No.: US 7,626,887 B2
(45) Date of Patent: Dec. 1, 2009

(54) DISPLACEMENT FIELD CALCULATION

(75) Inventors: Victor Aarre, Stavanger (NO); Reidar Devold Midtun, Sandnes (NO)

(73) Assignee: WesternGeco L.L.C., Houston, TX (US)

( * ) Notice: Subject to any disclaimer, the term of this patent is extended or adjusted under 35 U.S.C. 154(b) by 7 days.

(21) Appl. No.: 11/469,519

(22) Filed: Sep. 1, 2006

(65) Prior Publication Data

US 2007/0247972 A1  Oct. 25, 2007

Related U.S. Application Data

(60) Provisional application No. 60/793,179, filed on Apr. 19, 2006.

(51) Int. Cl.
    *G01V 1/36* (2006.01)
(52) U.S. Cl. ....................................................... 367/50
(58) Field of Classification Search .................... 367/55
    See application file for complete search history.

(56) References Cited

U.S. PATENT DOCUMENTS

| 4,733,747 | A | * | 3/1988 | McCormack | ............... 181/107 |
| 4,752,916 | A | * | 6/1988 | Loewenthal | ................. 367/24 |
| 6,002,642 | A | * | 12/1999 | Krebs | ......................... 367/73 |
| 6,381,544 | B1 | * | 4/2002 | Sallas et al. | .................... 702/17 |
| 6,418,079 | B1 | * | 7/2002 | Fleure | ......................... 367/40 |
| 6,470,276 | B1 | * | 10/2002 | Lansley et al. | ................ 702/16 |
| 6,574,563 | B1 | * | 6/2003 | Nickel | .......................... 702/14 |
| 6,640,190 | B2 | * | 10/2003 | Nickel | .......................... 702/14 |
| 6,757,217 | B2 | * | 6/2004 | Eastwood et al. | ............. 367/52 |
| 6,757,615 | B2 | * | 6/2004 | Zauderer et al. | .............. 702/14 |
| 6,801,858 | B2 | * | 10/2004 | Nivlet et al. | .................. 702/14 |
| 7,222,023 | B2 | * | 5/2007 | Laurent et al. | ................ 702/18 |
| 2002/0161526 | A1 | * | 10/2002 | Fournier et al. | ............... 702/14 |
| 2002/0173917 | A1 | * | 11/2002 | Nickel | .......................... 702/14 |
| 2003/0043693 | A1 | * | 3/2003 | Eastwood et al. | ............. 367/41 |
| 2003/0231548 | A1 | * | 12/2003 | Gillard et al. | ................. 367/40 |

(Continued)

FOREIGN PATENT DOCUMENTS

GB        2394050 A  *  4/2004

(Continued)

OTHER PUBLICATIONS

Liner et al. Nonlinear pairwise alignment of seismic traces. Standford Exploration Project, Report 112. Nov. 11, 2002. pp. 171-181.*

(Continued)

*Primary Examiner*—Eric Bolda
*Assistant Examiner*—Ari M Diacou
(74) *Attorney, Agent, or Firm*—Ari Pramu Dji; Lian Gang (Mark) Ye; Jeffrey E. Griffin (57) ABSTRACT

Implementations of various technologies for a method for processing seismic data. In one implementation, the method includes (a) selecting a first trace from a first seismic data set and a second trace from a second seismic data set; (b) extracting one or more features of the same types from the first trace and the second trace; (c) matching the extracted features from the first trace with the extracted features from the second trace; and (d) calculating for a displacement field using one or more of the matching features of the first trace and the second trace.

19 Claims, 8 Drawing Sheets

U.S. PATENT DOCUMENTS

2004/0243312 A1 * 12/2004 Schonewille .................. 702/14
2005/0187916 A1 * 8/2005 Levin et al. ..................... 707/3

FOREIGN PATENT DOCUMENTS

WO     WO 2004031805 A1 * 4/2004

OTHER PUBLICATIONS

Hatchell, P.J. Measuring Reservoir Compaction using time-lapse timeshifts. Shell International Exploration and Production. 2005.*

Liner et al. Nonlinear Alighment of Seismic Traces. Leading Edge. V. 23. No. 11. pp. 1146-1150.*

Kolbjørnsen O et al, Estimation of Time Shift in 4D Seismic Data, Norwegian Computing Center, NR Note Sand Mar. 2005.

Liner et al, Nov. 2004, Nonlinear pairwise alignment of seismic traces, The leading Edge.

Roste, et al.; Estimation of layer thickness and velocity changes using 4D prestack seismic data; EAGE 67th Conference and Exhibition; Jun. 2005; Madrid, Spain.

Bertrand, et al.; Enhanced 4D processing and quantitative analysis on Troll West using multiple vintages of legacy data; Geotrace First Break; vol. 23; pp. 49-55; Sep. 2005.

Hatchell, et al.; Measuring reservoir compaction using time-lapse timeshifts; The Society of Exploration and Geophysicists; 2005.

Needleman, et al.; A general method applicable to the search for similarities in the amino acid sequence of two proteins; Journal of Molecular Biology; vol. 48, No. 3; pp. 443-453; Mar. 28, 1970.

Nickel, et al.; Non-rigid matching of migrated time-lapse seismic; The Society of Exploration and Geophysicists; 1999.

Kolbjornsen, et al.; Time Match—a method for estimating 4D time shift; Norwegian Computing Center, NR; SAND/03/05; Apr. 2005.

Bertrand, et al.; A high resolution workflow for 4D-friendly analysis: application of gas oil contact monitoring at Troll West; The Society of Exploration and Geophysicists; 2005; Houston, Texas US.

Landro, et al.; Quantitative estimation of compaction and velocity changes using 4D impedance and traveltime changes; Geophysics; vol. 69, No. 4; pp. 949-957; Jul.-Aug. 2004.

* cited by examiner

ABCNY--RQCLCR--PM
| | | | | || |
AYC--YNR--CKCRBP--

ABC--NYRQCLCR--PM
| | | | | || |
AYCYN--R--CKCRBP--

DISPLACEMENT FIELD CALCULATION

CROSS-REFERENCE TO RELATED APPLICATIONS

This application claims benefit of U.S. provisional patent application Ser. No. 60/793,179, filed Apr. 19, 2006, which is herein incorporated by reference.

BACKGROUND

1. Field of the Invention

Implementations of various technologies described herein generally relate to methods and systems for the acquisition, processing, and inversion of two or more sets of data signals obtained from the same subsurface area.

2. Description of the Related Art

The following descriptions and examples are not admitted to be prior art by virtue of their inclusion within this section.

Seismic data signals are typically acquired by measuring and recording data during a seismic survey. A seismic survey may be performed by repeatedly firing an impulsive seismic energy source at the surface of the earth, sea or seafloor and recording the received signals at a set of receivers. The receivers may typically be situated at the same surface as the source, but laterally displaced on regular grid positions. However, there may be situations where a non-regular distribution of the receivers is preferred or where the source and the receivers may be positioned at different depth levels. In a typical seismic survey, the source and the receivers may be displaced at fixed intervals (e.g., 25 meters) and in a certain direction (e.g., the "inline" direction). During the seismic survey, the cycle of firing the source and recording the received signals may be repeated a plurality of times. When firing the seismic source, a pressure wave may be excited and propagate into the subsurface. The pressure wave reflects off interfaces between various earth layers (such as rock, sand, shale, and chalk layers) and propagates upwardly to the set of receivers, where the particle velocity of the wave vibrations or the pressure oscillations of the wave may be measured and recorded. The strength of the reflected wave is proportional to the amount of change in elastic parameters, e.g., density, pressure velocity, and shear velocity, at the respective interfaces. Consequently, the data recorded by the receivers represents the elastic characteristics of the subsurface below the receivers. In order to arrive at volumetric images of the subsurface, the recorded signals may be processed to reduce noise and to focus and map the seismic signals to the points where the reflections occurred.

The recording of a single inline survey may commonly be referred to as a 2D seismic survey, whereas a plurality of inline or 2D surveys may commonly be referred to as a 3D seismic survey. Often, two or more 3D seismic surveys may be obtained from the same subsurface area at different times, typically with time lapses ranging from about a few months to a few years. Such surveys may commonly be referred to as time-lapse surveys. In this manner, seismic data may be acquired to monitor changes in the subsurface reservoirs caused by the production of hydrocarbons.

In a time-lapse survey when two seismic data traces are compared, two factors may change, i.e., the receptivity and the signal two-way travel time within the reservoir. When considering a seismic data set, the receptivity may be the amplitude of the seismic signal along one axis and the two-way travel time may be the time along the other axis. When analyzing the time-lapse survey, it may be desirable to discriminate between amplitude changes and two-way travel time changes or time shifts. A displacement field describing the time shift may be calculated and applied to one of the surveys.

In recent years, time-lapse seismic surveys have emerged as an important new prospecting methodology. One purpose of a time-lapse seismic survey may be to monitor changes in the seismic data signals that may be related to detectable changes in geological properties, such as fluid fill, propagation velocities, porosity, density, pressure, temperature, settlement of the overburden and the like. Analyzing these changes together with petroleum production data may assist in understanding the complex fluid mechanics of the system of migration paths, traps, and draining or sealing faults making up a hydrocarbon reservoir. Such knowledge may provide information regarding how to proceed with the exploitation of the field, such as where to place new production wells to reach bypassed pay, where to place injectors for enhanced oil recovery and the like. In the case of deciding where to place well trajectories, the situation in the reservoir overburden may become of interest as well. It may be desirable to know the in situ stress field and especially over-pressured zones to avoid well breakdowns. All this information may help produce a maximum quantity of hydrocarbons from the hydrocarbon reservoir at a minimum of cost. Accordingly, an improved method for processing time-lapse data and arriving at a better difference image may be desirable.

SUMMARY

Described herein are implementations of various technologies for a method for processing seismic data. In one implementation, the method includes (a) selecting a first trace from a first seismic data set and a second trace from a second seismic data set; (b) extracting one or more features of the same types from the first trace and the second trace; (c) matching the extracted features from the first trace with the extracted features from the second trace; and (d) calculating for a displacement field using one or more of the matching features of the first trace and the second trace.

Described herein are also implementations of various technologies for a computer system having a processor and a memory having program instructions executable by the processor to: (a) select a first trace from a first seismic data set and a second trace from a second seismic data set, wherein the first seismic data set is acquired from a first survey and the second seismic data set is acquired from a second survey after a predetermined amount of time has lapsed; (b) extract one or more features of the same types from the first trace and the second trace; (c) match the extracted features from the first trace with the extracted features from the second trace; and (d) calculate for a displacement field using one or more of the matching features of the first trace and the second trace.

Described herein are also implementations of various technologies for a method for processing seismic data. The method includes selecting a first trace from a first seismic data set and a second trace from a second seismic data set. The first seismic data set is acquired from a first survey and the second seismic data set is acquired from a second survey after a predetermined amount of time has lapsed. The method further includes extracting one or more features of the same types from the first trace and the second trace. Each feature includes one of a local curve maxima, local curve minima, zero crossing positive, zero crossing negative, or curve inflection point. The method further includes matching the extracted features from the first trace with the extracted features from the second trace and calculating for a displacement field using one or more of the matching features of the first trace and the second trace.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
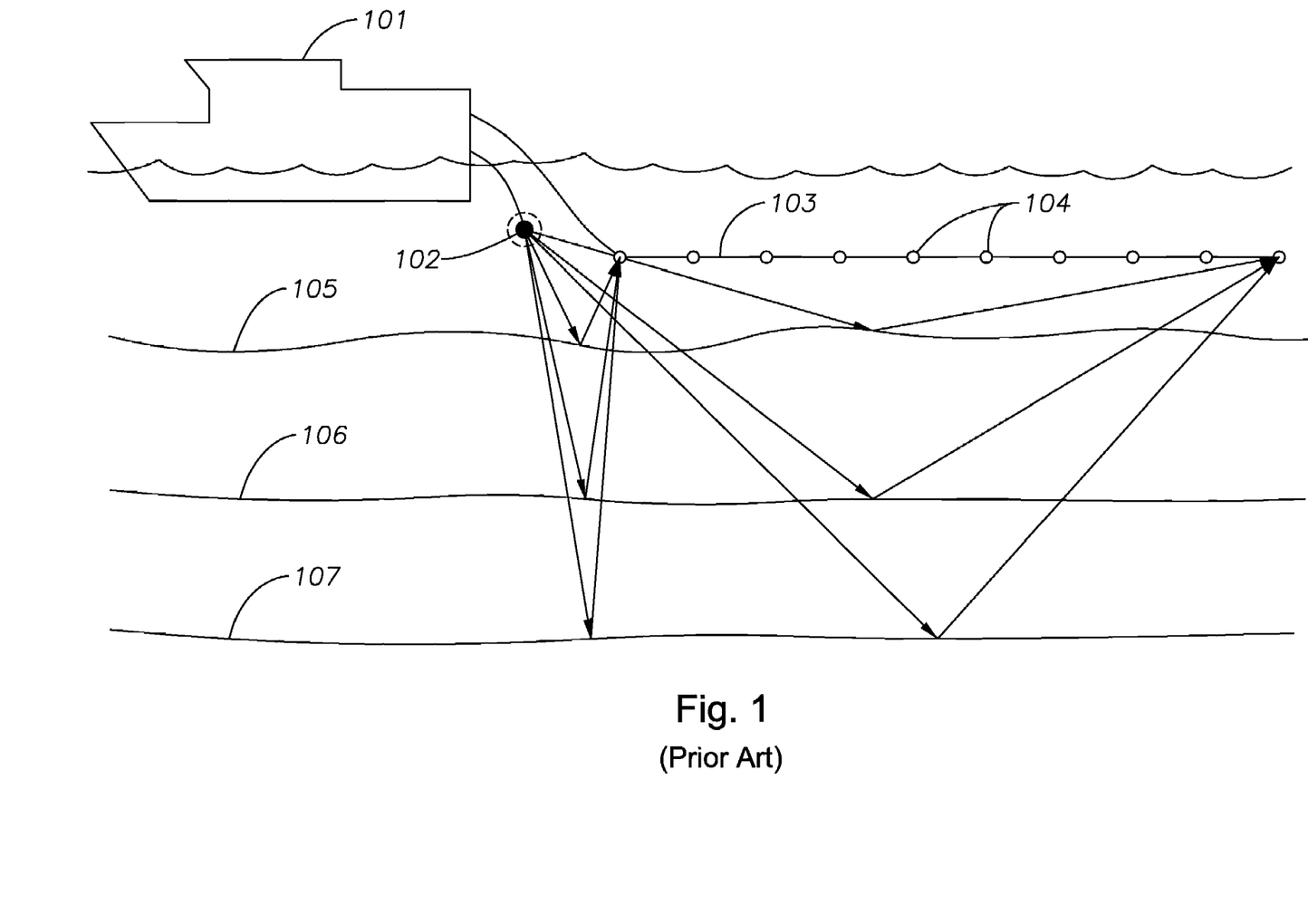
FIG. 1 illustrates a typical marine seismic survey.

FIG. 1 illustrates a typical marine seismic survey. A seismic survey vessel 101 may be used to tow one or more seismic sources, such as airguns 102, and seismic sensor arrays, such as a streamer 103. The streamer 103 may contain a plurality of receivers 104 which sense acoustic impulses and transmit the seismic data signals, referred to as seismic traces, to the seismic survey vessel 101 where they may be recorded. The airguns 102 may produce a series of acoustic pulses, which penetrate through the seabed 105 and are reflected by boundaries 106 and 107 between the geologic layers that have differing elastic properties. Often, two or more of the streamers 103 may be towed behind the seismic survey vessel 101 to obtain a three dimensional set of seismic data signals. Typically, the seismic data signals may be processed by various methods to reduce noise and enhance the signals of interest. In a time-lapse seismic survey, a second or monitor survey may be performed in the same location as a previous or baseline survey after some period of time. The surveys may be processed and compared to produce a difference image highlighting the changes in the subsurface structure. The time between acquisitions may range from a couple of months to a couple of years.

Figure 2:
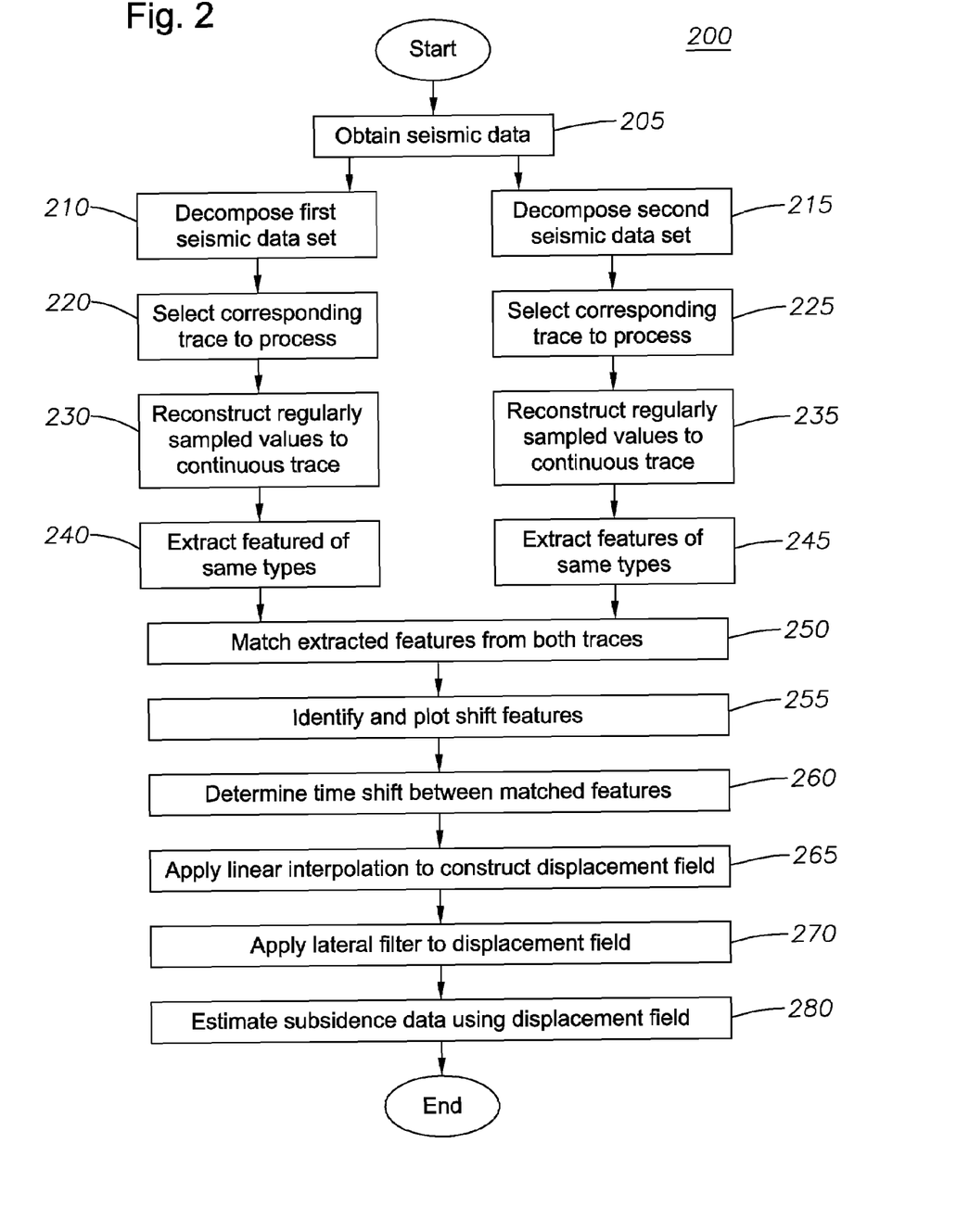
FIG. 2 illustrates a flow diagram for processing seismic data in accordance with implementations of various technologies described herein.

FIG. 2 illustrates a flow diagram 200 for processing seismic data in accordance with implementations of various technologies described herein. At step 205, seismic data from two or more seismic surveys may be obtained from a database. At steps 210 and 215, two time-lapse seismic data sets may be decomposed. The decomposition step may consist of extracting traces or subtraces from the time-lapsed data sets. The term trace may refer to a set of regularly sampled discrete seismic data stemming from the same lateral position, but from varying depths. The term subtrace may refer to a subset of seismic data samples of a trace.

Figure 3:
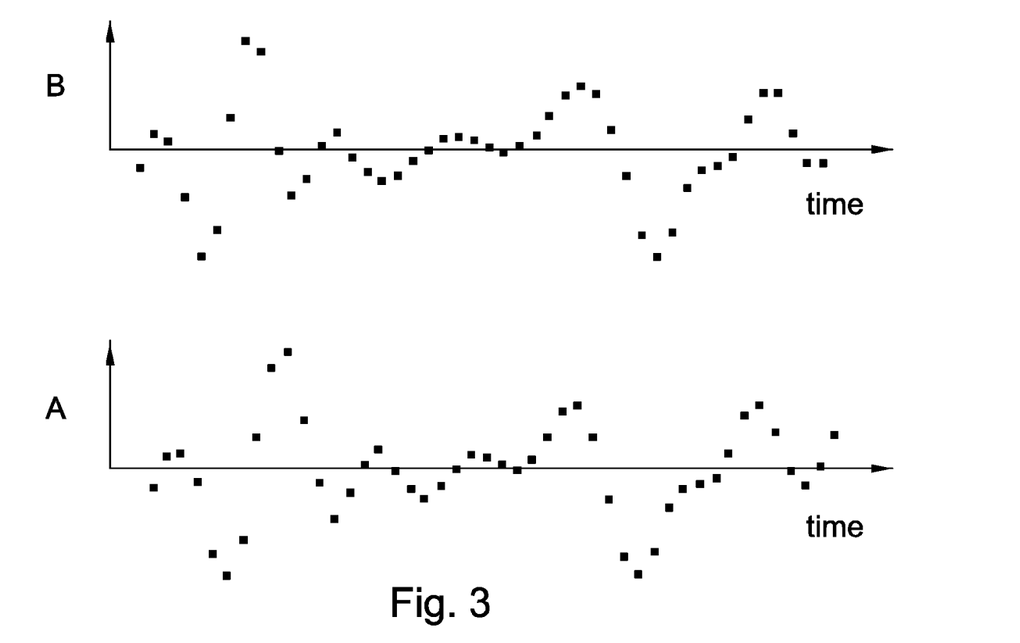
FIG. 3 illustrates two regularly sampled discrete seismic data traces in accordance with various implementations described herein.

At steps 220 and 225, corresponding traces from the two time-lapse data sets may be selected for processing in accordance with implementations of various technologies described herein. In one implementation, processing may be performed on a trace by trace basis. Accordingly, steps 220 to 270 may be repeated for each set of corresponding traces. FIG. 3 illustrates two regularly sampled discrete seismic data traces in accordance with various implementations described herein. For example, the bottom trace A may represent a trace from a baseline survey, while the top trace B may be a trace from a monitor or repeat survey. Each trace may be illustrated as amplitudes of a seismic signal sampled at regular time intervals, e.g., 2 ms, 4 ms, or the like.

Figure 4:
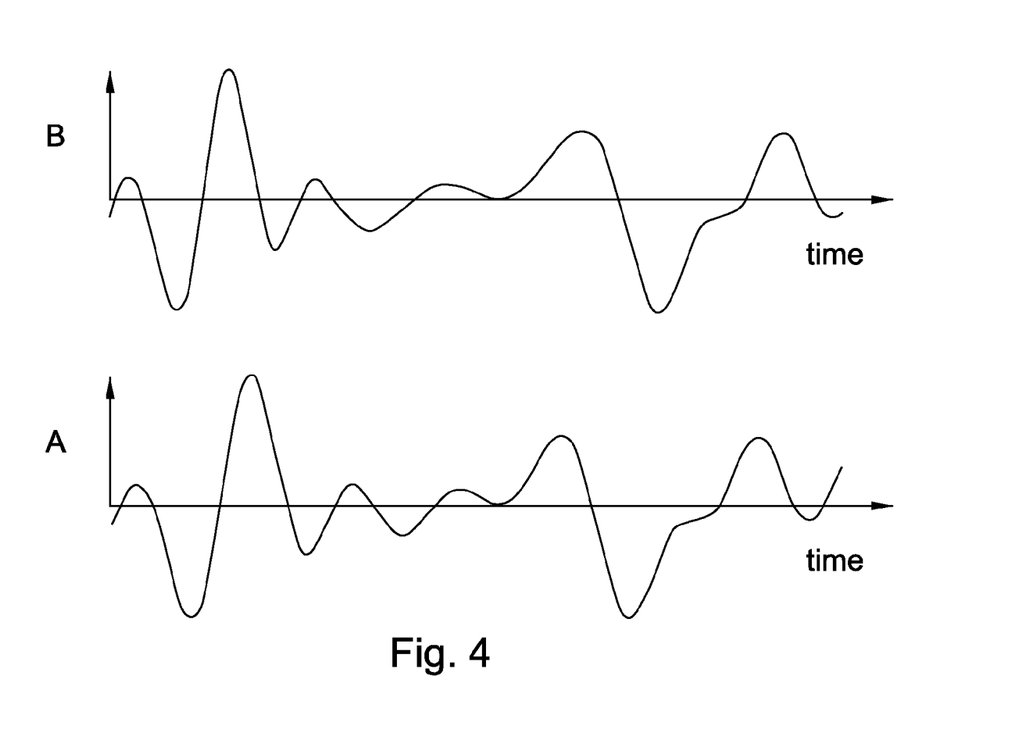
FIG. 4 illustrates the continuous seismic signals resulting from reconstructing the two sampled traces in FIG. 3.

At steps 230 and 235, the sampled trace values may be reconstructed into continuous seismic signal traces. FIG. 4 illustrates the continuous seismic signals resulting from reconstructing the two sampled traces in FIG. 3. This reconstruction may be accomplished by various mathematical methods, such as a second order polynomial fit and the like.

Figure 5:
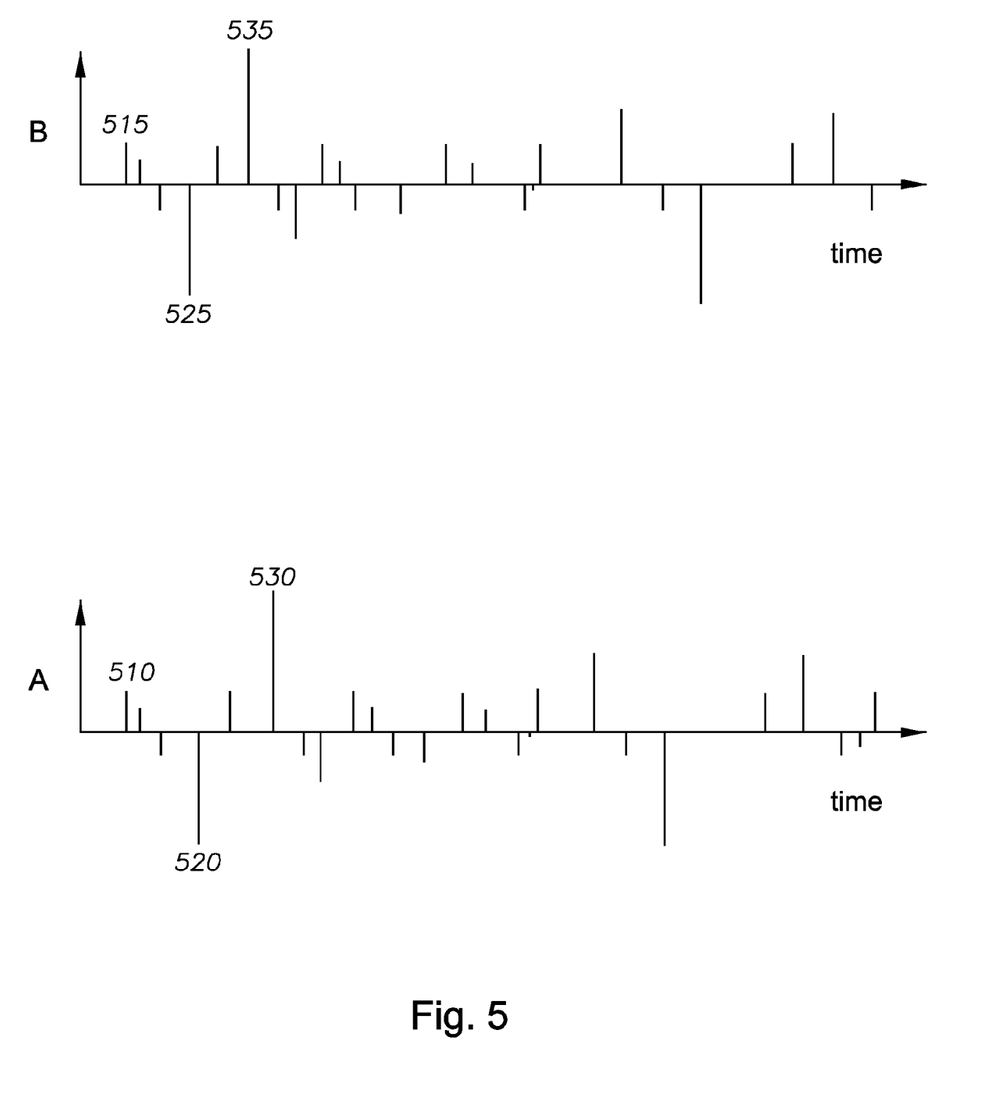
FIG. 5 illustrates the results of extracting constraining features from continuous traces illustrated in FIG. 4.

At steps 240 and 245, one or more features of the same types from the two continuous seismic signal traces may be extracted for further processing. A feature is used herein to mean a general curve characteristic or attribute. Each feature may be categorized as a particular feature type, such as local curve maxima, local curve minima, zero crossing positive, zero crossing negative, curve inflection point and the like. Each trace may include a number of feature types. Some of these feature types may be selected for feature matching and may be referred to as constraining features. All the constraining features may be identified on each trace at specific positions corresponding to time. FIG. 5 illustrates the results of extracting the constraining features from the continuous traces illustrated in FIG. 4. For example, features 510 and 515 represent zero crossing positive features. Features 520 and 525 represent local curve minima. Features 530 and 535 represent local curve maxima. Each extracted feature may have a horizontal position and a value. The horizontal position may correspond to the relative time the feature occurred and the value may represent the amplitude of the original seismic signal at that time. This step may be characterized as decomposing each trace into a set of describing features or moving from the seismic sampled domain to a feature domain.

Figure 6:
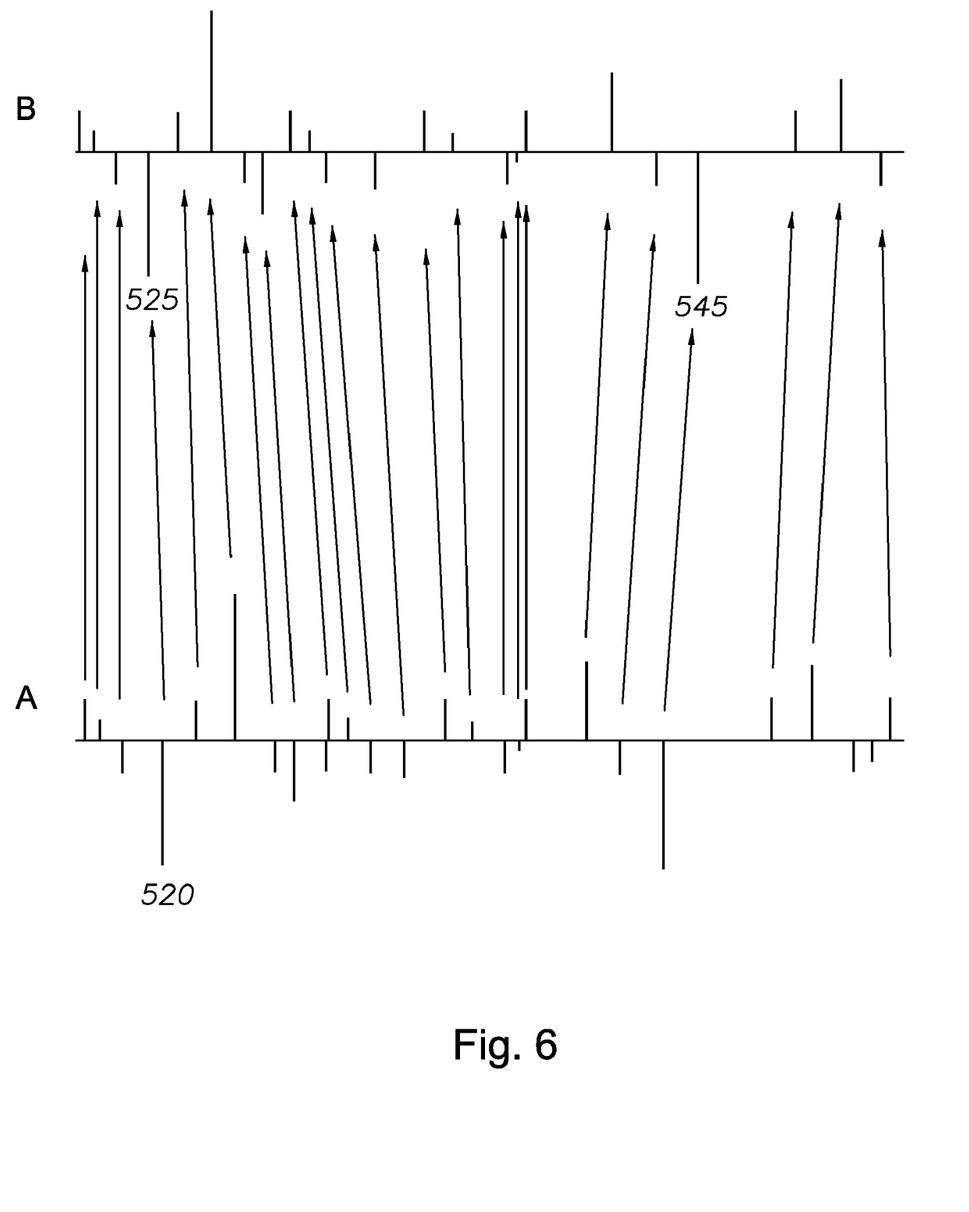
FIG. 6 illustrates pair-wise feature matching or alignment of the extracted constraining features illustrated in FIG. 5.

At step 250, the extracted constraining features from both seismic traces may be matched using a pair-wise alignment methodology. FIG. 6 illustrates pair-wise feature matching or alignment of the extracted constraining features illustrated in FIG. 5. The criteria used to match features may first be feature type and then feature value. In one implementation, small time shifts may be favored over larger time shifts. For example, the local curve minima 520 will be matched to a corresponding local curve minima. To further define an appropriate match, the amplitude of the local curve minima may be considered. Local curve minima 525 and 545 may be identified as having similar amplitudes. Because the time shift between local curve minima 520 and 525 is much smaller than the time shift between local curve minima 520 and 545, the match between local curve minima 520 and 525 may be preferred. Various matching global optimization algorithms, such as simulated annealing, finding combinations and the like, may be used to accomplish the feature match. It should be understood, however, that in some implementations, other types of optimization algorithms, such as local optimization algorithms, may be used to accomplish the feature match.

In one implementation, a modified Needleman Wunsch algorithm may be used. The Needleman-Wunsch (NW) algorithm is a nonlinear global optimization method that was developed for amino acid sequence alignment in proteins. This was one of the first alignment techniques used in the Human Genome Project. Human DNA consists of some 30,000 genes which are, in turn, composed of 20 amino acids represented by letters of a reduced alphabet (ADCEFGHILK-MNPQRSTVWY). The total genome is composed of about three billion letters, or 100,000 per gene. Finding where a particular string of amino acids fits on a protein is an optimization problem that aims to find the optimal alignment of two character strings with respect to a defined set of rules and parameter values for comparing different alignments. The NW algorithm is an iterative method in which all possible pairs of amino acids (one from each string) are set up in a 2D matrix and alignments are represented as pathways through this array. The NW algorithm is a global optimization process that yields a solution to the problem of pair-wise alignment of two character strings. If alignment of more than two strings is of interest, the problem can, in principle, be solved by decomposing it into a cascade of pair-wise alignments.

Figure 7:
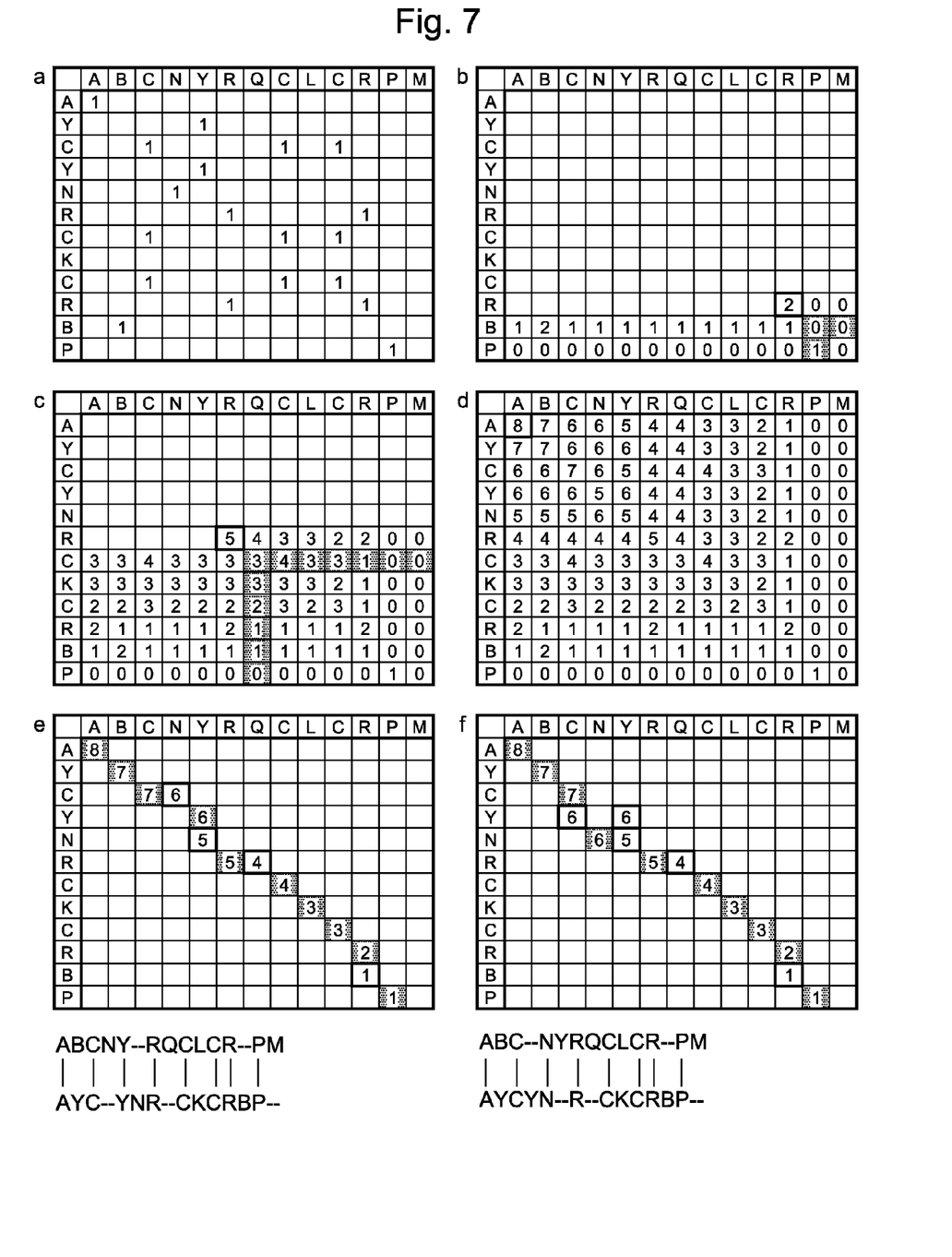
FIG. 7 illustrates the Needleman-Wunsch algorithm in its simplest form.

FIG. 7 illustrates the Needleman-Wunsch algorithm in its simplest form. A matrix is formed by placing the two strings, possibly of different length, along the left column and top row. In this step, a "1" is allocated to a cell in the matrix if the letter in each list at this location is the same; otherwise, no entry is made (which is a de facto zero). It is at this stage that the letter-alignment problem becomes purely numerical. In fact, the original string could just as easily consist of integers as letters. The result of this process is a similarity matrix as illustrated in FIG. 7*a*. From the similarity matrix, a scoring matrix is formed beginning in the lower right corner. The procedure is to add the score value to the maximum value in a row-column pair whose upper left corner is down and to the right of the current working position. Thus, in FIG. 7*b*, the similarity value "1" is added to the maximum value in the blackened cells (also "1") to give a score of 2. FIG. 7*c* is a later stage of the computation, which continues up and to the left until every cell has been visited and the scoring matrix is complete (FIG. 7*d*). A final score corresponds to how many character matches exist in the optimum alignment, and this is also a numerical measure of global similarity. The final step, called traceback, operates by starting at the highest score value (8 in this case) and determining the maximum score path by moving to the right, down, or diagonally down and to the right (FIG. 7*e*). The total traceback score is the sum of individual scores along the path, in this case 62. The fact that more than one 62-score alignment exists (FIG. 7*f*) is an expression of non-uniqueness. In the process of finding the best global alignment, the best alignments of any sub-length may also be determined. The NW algorithm may be described in more detail in A GENERAL METHOD APPLICABLE TO THE SEARCH FOR SIMILARITIES IN THE AMINO ACID SEQUENCE OF TWO PROTEINS by Needleman and Wunsch (Journal of Molecular Biology, 1970).

The NW algorithm may be used to provide the basis for optimal feature matching. The algorithm, though developed for amino acid alignment, may be adapted to compute non-linear pair-wise alignment between seismic traces. The algorithm may be further refined to determine optimum matching between features extracted from seismic traces. In this manner, the match of each feature may be optimized.

Further, features may be considered not matching if the feature property correlation is below an established, user-defined correlation threshold. The feature property correlation value may be considered a measure of goodness or quality of a match. The feature property correlation of all matches in the traces may then be used in a global optimization process to find the overall best matches and alignment of the traces.

Figure 8:
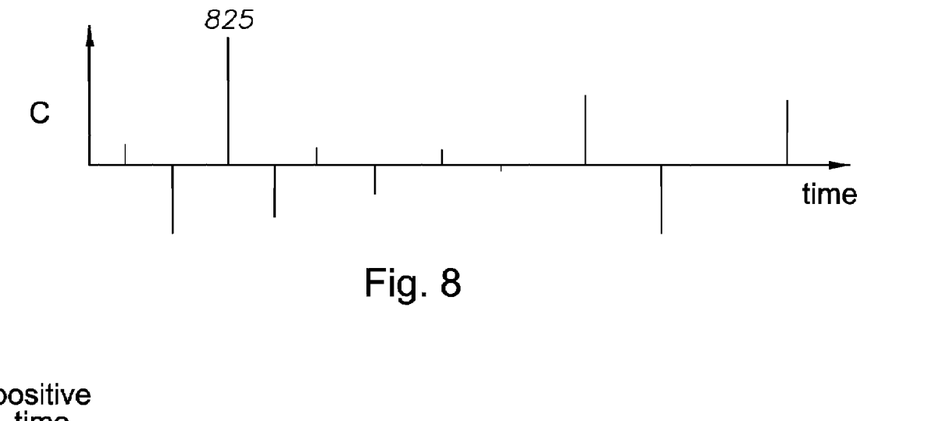
FIG. 8 illustrates a subset of selected shift features in accordance with implementations of various technologies described herein.

Many constraining features may be used to provide abundant data matches to optimize the trace alignment process. A subset of the constraining features may be defined as shift features. The shift features may typically be features corresponding to seismic events rather than mathematical characteristics of the trace. For example, the local curve maxima and local curve minima may be selected as shift features because they correspond to seismic events. These shift features may be used to calculate the displacement field between the two traces. At step 255, the shift features may be identified and plotted against time. The positioning of the shift features in time may be dependent on the particular data set that will be shifted by the displacement field. As such, the shift features may be positioned in accordance with the data set that will be shifted. FIG. 8 illustrates a subset of selected shift features in accordance with implementations of various technologies described herein. In this example, local curve minima and maxima are the only selected shift features. In trace C of FIG. 8, the shift features may be positioned horizontally on the time axis in the same positions found on trace B. That is, the shift feature local curve maxima 825 on trace C is located at the same position as the local curve maxima 535 on trace B, illustrated in FIG. 5. In one implementation, the shift features may be illustrated as having seismic amplitudes merely to indicate that local curve minima and maxima were selected as the shift features. In other words, the seismic signal amplitudes are only used to optimize the feature matching and are discarded at this point in the process, i.e., at this point, the calculations are independent of seismic amplitude.

Figure 9:
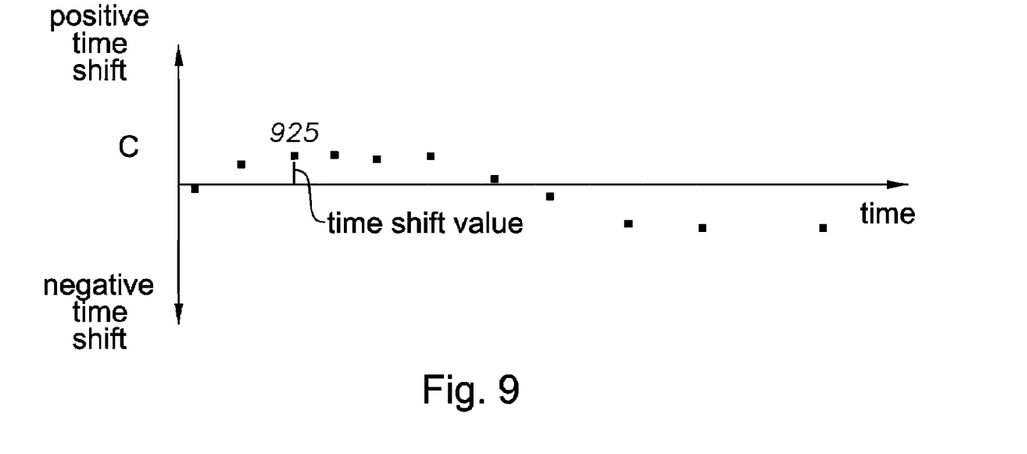
FIG. 9 illustrates a plot of time shift values in accordance with various implementations described herein.

At step 260, the time shift between the matched features may be determined. The time shift between each shift feature in the first trace and each matching shift feature in the second trace may be computed. The time shift values may be plotted at the shift feature positions determined in step 255, as shown in FIG. 9. As discussed above, the seismic signal amplitude has been discarded and the new amplitude represents the time shift between each pair of matched features. For example, the amplitude of time shift value 925 represents the time shift from maxima 530 on trace A to maxima 535 on trace B shown in FIG. 5. The horizontal time position of time shift value 925 is the same the horizontal time position of maxima 535 on trace B. The plot of time shift values in FIG. 9 may be used to match trace B to trace A. That is, trace B may be adjusted by the amplitude of the time shift values at the horizontal time positions to match trace A. For example, the maxima from trace B may be moved in a positive direction (forward in time) by the amplitude at time shift value 925 to be coincident in time with maxima 530 from trace A.

Figure 10:
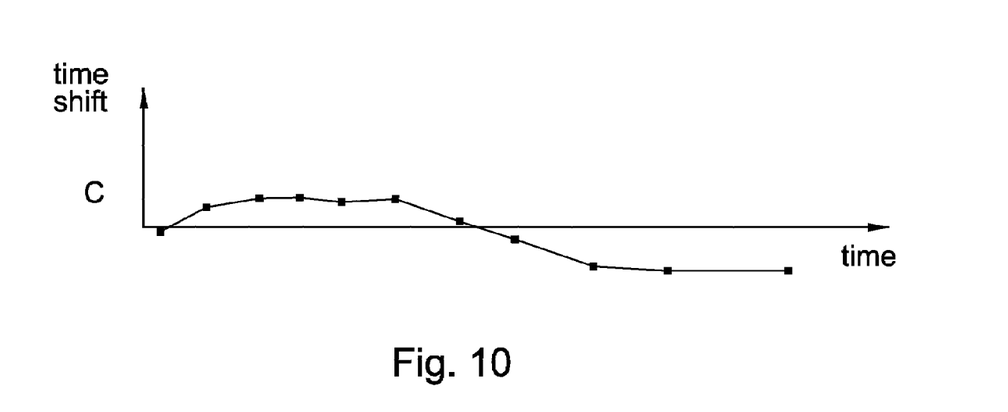
FIG. 10 illustrates a displacement field resulting from linear interpolation of the time shift values.

In order for the seismic traces selected at steps 230 and 235 to be fully aligned, the feature shifts may be converted to a regularly sampled trace, or displacement field, that can be applied to the trace selected at step 235. The displacement field may be a representation of the time shift between the two traces. Since the time shift may vary along a trace, the displacement field may represent the shift as a curve over time. Accordingly, at step 265, a linear interpolation may be applied to the time shift values determined at step 260 to construct the displacement field. In this manner, the time shift values in the feature domain may be transformed back to the regularly sampled seismic domain. FIG. 10 illustrates a displacement field resulting from linear interpolation of the time shift values.

At step 270, a lateral filter may be applied to the displacement field. In one implementation, the displacement field may be applied to trace B and steps 240 through 270 may be iterated to fine tune the displacement field. As many iterations as desired may be performed. Steps 220-270 may be performed for all traces from the first seismic data set and the second seismic data set. One displacement field may be calculated for each pair of traces extracted from both data sets. In this manner, a displacement value may be determined for each point in a seismic data volume. In a time-lapse survey, the displacement field may be utilized to align the monitor survey to the baseline survey before post processing such that a better difference image may be achieved.

As such, at step 280, an estimate of subsidence data may be calculated using the displacement field.

Additionally, the displacement field may be used in various post processing steps, such as 4D inversion, alignment of events prior to AVO inversion, estimating a relative change of the acoustic impedance and the like. Certain aspects of post processing steps are described in more detail in commonly assigned U.S. Pat. No. 6,640,190, which is incorporated herein by reference.

Although implementations of various technologies described herein are with reference to a marine seismic acquisition, it should be understood that some implementations may be used in other types of seismic acquisitions, such as land seismic acquisition. Further, although implementations of various technologies described herein are with reference to a time-lapse seismic acquisition, it should be understood that other implementations may be used in pre-processing application in which normal move-out (NMO) corrected data may be further aligned before seismic stacking and the like.

Figure 11:
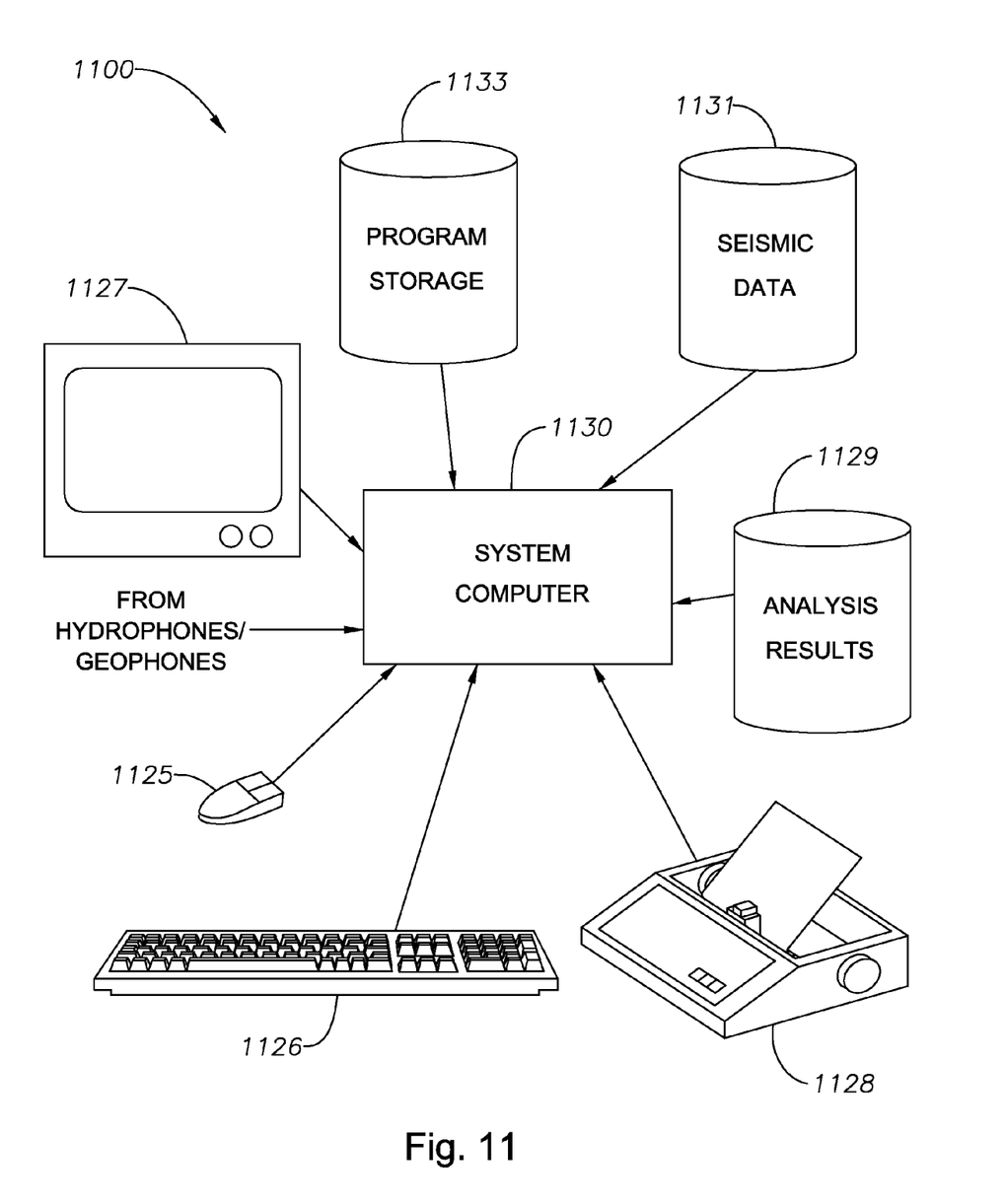
FIG. 11 illustrates a computer network, into which implementations of various technologies described herein may be implemented.

FIG. 11 illustrates a computer network 1100, into which implementations of various technologies described herein may be implemented. The computer network 1100 may include a system computer 1130, which may be implemented as any conventional personal computer or server. However, those skilled in the art will appreciate that implementations of various technologies described herein may be practiced in other computer system configurations, including hypertext transfer protocol (HTTP) servers, hand-held devices, multi-processor systems, microprocessor-based or programmable consumer electronics, network PCs, minicomputers, mainframe computers, and the like.

The system computer 1130 may be in communication with disk storage devices 1129, 1131, and 1133, which may be external hard disk storage devices. It is contemplated that disk storage devices 1129, 1131, and 1133 are conventional hard disk drives, and as such, will be implemented by way of a local area network or by remote access. Of course, while disk storage devices 1129, 1131, and 1133 are illustrated as separate devices, a single disk storage device may be used to store any and all of the program instructions, measurement data, and results as desired.

In one implementation, seismic data from the receivers may be stored in disk storage device 1131. The system computer 1130 may retrieve the appropriate data from the disk storage device 1131 to process seismic data according to program instructions that correspond to implementations of various technologies described herein. The program instructions may be written in a computer programming language, such as C++, Java and the like. The program instructions may be stored in a computer-readable medium, such as program disk storage device 1133. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 1130 may present output primarily onto graphics display 1127, or alternatively via printer 1128. The system computer 1130 may store the results of the methods described above on disk storage 1129, for later use and further analysis. The keyboard 1126 and the pointing device (e.g., a mouse, trackball, or the like) 1125 may be provided with the system computer 1130 to enable interactive operation.

The system computer 1130 may be located at a data center remote from the survey region. The system computer 1130 may be in communication with the receivers (either directly or via a recording unit, not shown), to receive signals indicative of the reflected seismic energy. These signals, after conventional formatting and other initial processing, may be stored by the system computer 1130 as digital data in the disk storage 1131 for subsequent retrieval and processing in the manner described above. While FIG. 11 illustrates the disk storage 1131 as directly connected to the system computer 1130, it is also contemplated that the disk storage device 1131 may be accessible through a local area network or by remote access. Furthermore, while disk storage devices 1129, 1131 are illustrated as separate devices for storing input seismic data and analysis results, the disk storage devices 1129, 1131 may be implemented within a single disk drive (either together with or separately from program disk storage device 1133), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data performed by a processor executing program instructions on a computer readable memory, the method comprising:
   (a) selecting a first trace from a first seismic data set and a second trace from a second seismic data set, wherein the first seismic data set and the second seismic data set were acquired from one or more seismic receivers;
   (b) extracting one or more features of a same type from the first trace and the second trace, wherein the extracted features comprise only a portion of the first trace and the second trace;
   (c) matching the extracted features from the first trace with the extracted features from the second trace;
   (d) calculating for a displacement field using one or more of the matching features of the first trace and the second trace, wherein the displacement field is a regularly sampled trace representing a time shift between the first trace and the second trace; and
   (e) applying the displacement field to the second trace to align the second trace to the first trace.

2. The method of claim 1, wherein the first seismic data set is acquired from a first survey and the second seismic data set is acquired from a second survey after a predetermined amount of time has lapsed.

3. The method of claim 1, wherein calculating for the displacement field comprises:
   determining a time shift between each of the one or more of the matching features of the first trace and the second trace; and
   converting the time shifts to the displacement field.

4. The method of claim 3, wherein the time shifts are converted to the displacement field by applying a linear interpolation to the time shifts.

5. The method of claim 1, further comprising applying a lateral filter to the displacement field.

6. The method of claim 1, further comprising repeating steps (a)-(d) for each trace in the first seismic data set and the second seismic data set.

7. The method of claim 1, further comprising estimating subsidence data using the displacement field.

8. The method of claim 1, wherein the same type is selected from a group consisting of a local curve maxima, local curve minima, zero crossing positive, zero crossing negative and curve inflection point.

9. The method of claim 1, wherein the extracted features from the first trace and the extracted features from the second trace are matched using a pair-wise alignment methodology.

10. The method of claim 9, wherein the pair-wise alignment methodology is a Needleman-Wunsch algorithm.

11. The method of claim 1, wherein the extracted features from the first trace and the extracted features from the second trace are matched using a global optimization methodology.

12. A computer system, comprising:
   a processor;
   a display, and
   a memory comprising program instructions executable by the processor to:
      (a) select a first trace from a first seismic data set and a second trace from a second seismic data set, wherein the first seismic data set is acquired from a first survey and the second seismic data set is acquired from a second survey after a predetermined amount of time has lapsed, and wherein the first seismic data set and the second seismic data set were acquired from one or more seismic receivers;
      (b) extract one or more features of a same type from the first trace and the second trace, wherein the extracted features comprise only a portion of the first trace and the second trace;
      (c) match the extracted features from the first trace with the extracted features from the second trace;
      (d) calculate for a displacement field using one or more of the matching features of the first trace and the second trace, wherein the displacement field is a regularly sampled trace representing a time shift between the first trace and the second trace; and
      (e) apply the displacement field to the second trace to align the second trace to the first trace.

13. The computer system of claim 11, wherein the memory further comprises program instructions executable by the processor to repeat steps (a)-(d) for each trace in the first seismic data set and the second seismic data set.

14. The computer system of claim 11, wherein each feature comprises one of a local curve maxima, local curve minima, zero crossing positive, zero crossing negative, curve inflection point.

15. The computer system of claim 11, wherein the extracted features from the first trace and the extracted features from the second trace are matched using a pair-wise alignment methodology.

16. A method for processing seismic data performed by a processor executing program instructions on a computer readable memory, the method comprising:
   selecting a first trace from a first seismic data set and a second trace from a second seismic data set, wherein the first seismic data set is acquired from a first survey and the second seismic data set is acquired from a second survey after a predetermined amount of time has lapsed, and wherein the first seismic data set and the second seismic data set were acquired from one or more seismic receivers;
   extracting one or more features of a same type from the first trace and the second trace, wherein the same type is selected from a group consisting of a local curve maxima, local curve minima, zero crossing positive, zero crossing negative and curve inflection point and wherein the extracted features comprise only a portion of the first trace and the second trace;
   matching the extracted features from the first trace with the extracted features from the second trace;
   calculating for a displacement field using one or more of the matching features of the first trace and the second trace, wherein the displacement field is a regularly sampled trace representing a time shift between the first trace and the second trace; and
   applying the displacement field to the second trace to align the second trace to the first trace.

17. The method of claim 16, wherein the extracted features from the first trace and the extracted features from the second trace are matched using a Needleman-Wunsch algorithm.

18. The method of claim 1, wherein the regularly sampled trace represents one or more varying time shifts between the matching features of the first trace and the second trace.

19. The method of claim 1, wherein the regularly sampled is a curve over time.

* * * * *